United States Patent Office 3,527,831
Patented Sept. 8, 1970

3,527,831
1,3-PENTADIENE RECOVERY
George C. Blytas, Kensington, Calif., assignor to Shell Oil Company, New York, N.Y., a corporation of Delaware
No Drawing. Filed Apr. 12, 1968, Ser. No. 721,070
Int. Cl. C07c 7/00, 11/00
U.S. Cl. 260—681.5   4 Claims

ABSTRACT OF THE DISCLOSURE

Separation of 1,3-pentadiene from isoprene by selectively complexing the 1,3-pentadiene with cuprous chloride in the presence of selected proportions of an inert diluent.

BACKGROUND OF THE INVENTION

Many methods have been used to separate mixtures of hydrocarbons with different degrees of unsaturation. Thus, it has long been known that olefins may be extracted from mixtures with saturated hydrocarbons by aqueous solutions of salts of copper(I), silver, mercury(II), and platinum(II) and like metal ions.

It is generally recognized that, when considering complexes of a given metallic ion, the more highly unsaturated olefins form more stable complexes. Thus, it is often possible to recover a diolefin from a mixture of the diolefin and a monoolefin by selectively forming the more stable diolefin-metal complex and subsequently separating and decomposing the complex. However, although separations of diolefins from monoolefins are readily accomplished by selective formation of diolefin-metal complexes, the separation of mixtures of closely-boiling diolefins, especially mixtures of isomeric diolefins such as 1,3-pentadiene and isoprene, is generally very difficult, if not impossible, by known methods employing metal salts. For example, Ward and Makin, J. Am. Chem. Soc., 59, 657 (1947), disclose that although 1,3-pentadiene and isoprene are together readily separated from mixtures containing the same and also monoolefins as by complexing the 1,3-pentadiene and isoprene with cuprous chloride, the separation of pure 1,3-pentadiene or pure isoprene from mixtures containing both 1,3-pentadiene and isoprene could not be accomplished by means of cuprous chloride complex formation.

SUMMARY OF THE INVENTION

It has now been found that cuprous chloride-1,3-pentadiene complexes are selectively formed in the presence of isoprene by contacting hydrocarbon mixtures containing 1,3-pentadiene, isoprene and optionally other closely boiling hydrocarbons, with cuprous chloride in the presence of inert diluents in specified critical molar proportions. The selective formation of the cuprous chloride-1,3-pentadiene complex permits the separation and purification of 1,3-pentadiene from mixtures containing the same, isoprene and other closely boiling components of various lesser degrees of unsaturation by the procedures of separating the cuprous chloride-1,3-pentadiene complex from the hydrocarbon phase and decomposing the complex to give 1,3-pentadiene. Concomitantly, isoprene is purified of 1,3-pentadiene.

DESCRIPTION OF THE PREFERRED EMBODIMENTS

Pentadiene-isoprene feed.—The process of the invention is generally applicable to the separation of 1,3-pentaidene from any hydrocarbon mixture containing 1,3-pentadiene, isoprene and other closely boiling non-acetylenic hydrocarbons, e.g., $C_5$-hydrocarbons such as pentene-2, 2-methylbutene-2, 4-methylbutene-1, cyclopentene, cyclopentadiene and 1,4-pentadiene, and $C_6$-hydrocarbons such as hexane, 2,3 - dimethylbutene-1,2-methylpentene-1, 2-methylpentene-2, 2-methylpentane and 4-methylpentene-2. However, the process of the invention is particularly advantageously employed for the recovery of 1,3-pentadiene from hydrocarbon streams containing at least 20%, preferably at least 30%, by weight of 1,3-pentadiene with the remainder consisting essentially of at least 1%, preferably at least 5%, by weight of isoprene and any remainder being $C_5$–$C_6$ saturated and monoolefinic hydrocarbons.

Cuprous chloride.—Any commercially available grade of cuprous chloride of reasonable purity is operable in the process of the invention. Preferably, however, the purity of the cuprous chloride is at least 90% by weight.

In order to insure substantially complete complexing of the 1,3-pentadiene, substantially one mole of cuprous chloride is provided for each olefinic linkage of the 1,3-pentadiene, e.g., molar ratios of cuprous chloride to 1,3-pentadiene of from about 1.8:1 to about 2.4:1 are generally satisfactory.

Inert diluent.—The use of an inert diluent in specified critical molar proportions, relative to the isoprene in the hydrocarbon feed mixture, is essential to the selective formation of cuprous chloride-1,3-pentadiene complex and therefore to the separation of 1,3-pentadiene in high purity. In general, a molar ratio of inert diluent to isoprene of from 0.8:1 to 10:1 is satisfactory with a molar ratio of from about 1.8:1 to about 6:1 being preferred.

By the term "inert diluent" is meant a diluent which does not complex with cuprous chloride so long as an excess (more than equimolar amount based on cuprous chloride) of uncomplexed 1,3-pentadiene or isoprene is present. Suitable inert diluents include saturated hydrocarbons of from 5 to 20 carbon atoms such as pentane, hexane, isooctane, decane, dodecane, tetradecane and eicosane as well as the corresponding monoolefinic hydrocarbons. It is therefore apparent that whatever saturated or monoolefinic hydrocarbon of from 5 to 20 carbon atoms which is present in 1,3-pentadiene-isoprene hydrocarbon stream is suitably employed as part of the total amount of inert diluent required according to the specified critical molar ratios previously noted. However, in cases in which the amount of inert components in the 1,3-pentadiene-isoprene hydrocarbon feed is not sufficient to supply the requisite critical amount of inert diluent, it is preferred to employ saturated hydrocarbons as the additionally required inert diluent, particularly alkanes of at least 6 carbon atoms.

Reaction conditions.—Provided that the pentadiene-isoprene feed contains the inert diluent in the specified critical amount, the selective complexing of 1,3-pentadiene and the subsequent separation and decomposition of the resulting cuprous chloride-1,3-pentadiene complex are conducted by more or less conventional procedures. In one modification, complex formation is carried out by charging a mixture of the 1,3-pentadiene-isoprene feed and inert diluent to an autoclave or similar reactor maintained at reaction conditions while cuprous chloride is added in increments. In another modification, the entire amounts of reaction mixture components are contacted in a reactor maintained at reaction temperature and pressure. In any modification, complex formation is effected at a temperature of from about 0° C. to about 50° C. Complex formation is effected at any convenient pressure, although substantially atmospheric pressure, e.g., about 0 p.s.i.g. to about 100 p.s.i.g., is preferred. It is also generally preferred to effect complex formation in an inert, i.e., oxygen-free and substantially anhydrous, reaction environment.

In some instances, it is useful to introduce into the cuprous chloride reaction mixture as a catalyst a minor amount of a lower alkanol such as methanol or ethanol, to catalyze complex formation at a more rapid rate. No alcohol is required, however, and even in instances where catalyst was supplied initially, additional catalyst is not required when complex formation has begun. In order to further facilitate complex formation and aid in the mechanical handling and mixing of the cuprous chloride reaction mixture, it is also often useful to introduce into the cuprous chloride reaction mixture from about 10% to about 25% by weight based on cuprous chloride of a non-absorbent carrier such as sand and the like.

Subsequent to complex formation, the cuprous chloride-1,3-pentadiene complex is separated from the liquid hydrocarbon phase as by simple filtration or by other conventional solid-liquid separation methods such as rotary filtration or other methods based on centrifugal force, e.g., by using hydrocyclones. Generally, to insure complete separation of the 1,3-pentadiene-cuprous chloride complex from the remaining olefinic component in the hydrocarbon feed, it is desirable to wash the cuprous chloride-1,3-pentadiene complex with a saturated hydrocarbon solvent, e.g., an alkane, to remove all adherent mother liquid.

The pure cuprous chloride-1,3-pentadiene complex is decomposed to yield pure 1,3-pentadiene by heating to a temperature of from about 75° C. to about 120° C., preferably in an inert solvent to insure that an even means of heat transfer is available to cause decomposition. After decomposition is completed, filtration is utilized to remove the cuprous chloride, which is used again for further complex formation, from the liquid mixture of the 1,3-pentadiene and inert solvent. The 1,3-pentadiene is then separated from the liquid mixture, e.g., as by distillation.

1,3-pentadiene finds utility in a variety of applications, particularly in the production of polymers. For example, copolymerization of 1,3-pentadiene, butadiene and sulfur dioxide produces polysulfones which possess improved thermal stability and crystalline structure upon hydrogenation as disclosed by U.S. 3,336,272 of Youngman et al., issued Aug. 15, 1967.

To further illustrate the process of the invention, the following examples are provided. It should be understood that the details thereof are not to be regarded as limitations, as they may be varied as will be understood by one skilled in this art.

EXAMPLE I

The selective formation of the cuprous chloride-1,3-pentadiene complex employing specified critical molar proportions of inert diluents is illustrated by the following experiments. In a typical experiment, a hydrocarbon mixture containing known amounts of 1,3-pentadiene, isoprene, 2-methylbutene-2 (a representative olefin), decane (a representative saturate), and 2–3% vol. methanol is contacted with a mixture of 80% w. cuprous chloride and 20% w. sand in a stirred reactor. Upon completion of complex formation (3 hours), the composition of the liquid phase is analyzed by gas-liquid chromatography. The extent of sorption of $C_5$-unsaturates is determined by comparing the analysis of the hydrocarbon feed before complex formation with the analysis of the liquid phase in contact with the cuprous chloride. From the changes in composition of the liquid phase, the amount of $C_5$-unsaturates sorbed is calculated. In runs 10, 11 and 12 the amount of reactants and the reaction conditions employed are identical to runs 2, 4, and 7, respectively, except that no inert diluents are employed. The composition of hydrocarbon feed, the amount of pentane, the amount of cuprous chloride, the reaction temperature and the percent of complexing of each $C_5$-unsaturate are tabulated in Table 1.

EXAMPLE II

The conventional procedure used for the recovery of 1,3-pentadiene from the cuprous chloride-1,3-pentadiene complex is illustrated by the following experiment. A sample of cuprous chloride-1,3-pentadiene, prepared as described in Example I, is placed in a sintered-metal microporous filter and washed with an equal weight of decane four times. The washed cuprous chloride-1,3-pentadiene complex (49% recovery from washing procedure) is then decomposed by heating in decane solvent at a temperature of 80° C. to produce unsaturated hydrocarbon product which is 99.99% pure 1,3-pentadiene, as determined by gas-liquid chromatography.

TABLE 1

| Run | Feed composition, 100 g. | | | Decane, g. | CuCl, g. | Temp., °C. | Amount of feed components complexed, percent w. | | | |
|---|---|---|---|---|---|---|---|---|---|---|
| | 1,3-pentadiene, percent w. | Isoprene, percent w. | 2-methyl-butene-2, percent w. | | | | 1,3-penta-diene | Isoprene | 2-methyl-butene-2 | Decane |
| 1 | 90 | 10 | 0 | 114 | 260 | 20 | 93.0 | 0 | | 0 |
| 2 | 90 | 10 | 0 | 114 | 312 | 20 | 92.1 | 0 | | 0 |
| 3 | 40 | 60 | 0 | 678 | 115 | 20 | 65.8 | 0 | | 0 |
| 4 | 40 | 60 | 0 | 360 | 138 | 30 | 66.0 | 0 | | 0 |
| 5 | 40 | 60 | 0 | 116 | 115 | 40 | 63.2 | 0 | | 0 |
| 6 | 20 | 80 | 0 | 904 | 57.5 | 20 | 7.9 | 0 | | 0 |
| 7 | 20 | 80 | 0 | 160 | 69 | 40 | 8.1 | 0 | | 0 |
| 8 | 40 | 10 | 50 | 64 | 115 | 30 | 78.5 | 0 | 0 | 0 |
| 9 | 40 | 10 | 50 | 0 | 115 | 40 | 82.7 | 0 | 0 | |
| 10 | 90 | 10 | 0 | 0 | 312 | 20 | 99.8 | 99.7 | | |
| 11 | 40 | 60 | 0 | 0 | 138 | 30 | 89.1 | 19.0 | | |
| 12 | 20 | 80 | 0 | 0 | 69 | 40 | 52.1 | 16.1 | | |

I claim as my invention:

1. A process of separating 1,3-pentadiene from hydrocarbon feed mixtures consisting essentially of at least 1% by weight of isoprene, inert $C_5$–$C_6$ saturated and monoolefinic hydrocarbons, and at least 20% by weight of 1,3-pentadiene by selectively complexing the 1,3-pentadiene with cuprous chloride at a temperature of from about 0° C. to about 50° C. and in the additional presence of sufficient inert saturated $C_4$–$C_{20}$ hydrocarbon to provide a molar ratio of total inert hydrocarbons to isoprene of from about 0.8:1 to about 10:1, and removing the noncomplexed hydrocarbons in one phase from the resulting cuprous chloride-1,3-pentadiene complex in a second phase.

2. The process of claim 1 wherein the temperature is from about 20° C. to about 50° C.

3. The process of claim 2 wherein the molar ratio of total inert hydrocarbons to isoprene is from about 1.8:1 to about 6:1.

4. The process of claim 3 wherein the hydrocarbon feed consists of at least 30% by weight of 1,3-pentadiene and at least 5% by weight of isoprene.

References Cited

UNITED STATES PATENTS 3,260,766    7/1966    Nudenberg et al. _____ 260—677
2,589,960    3/1952    Ray _____ 260—677

DELBERT E. GANTZ, Primary Examiner

G. E. SCHMITKONS, Assistant Examiner

U.S. Cl. X.R.

260—677